United States Patent
Narayan et al.

(10) Patent No.: US 12,413,501 B2
(45) Date of Patent: Sep. 9, 2025

(54) SYSTEMS AND METHODS FOR CONSTRUCTING APPLICATION-AWARE VIRTUAL TOPOLOGIES IN WIDE AREA NETWORKS

(71) Applicant: Arista Networks, Inc., Santa Clara, CA (US)

(72) Inventors: Abhijith Kudupu Narayan, Santa Clara, CA (US); Venkitraman Kasiviswanathan, San Ramon, CA (US); Alton Lo, Fremont, CA (US); Udayakumar Srinivasan, Santa Clara, CA (US); Kumaran Narayanan, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/731,073

(22) Filed: May 31, 2024

(65) Prior Publication Data

US 2024/0323111 A1 Sep. 26, 2024

Related U.S. Application Data

(63) Continuation of application No. 17/535,248, filed on Nov. 24, 2021, now Pat. No. 12,003,401.

(60) Provisional application No. 63/229,715, filed on Aug. 5, 2021.

(51) Int. Cl.
*H04L 45/02* (2022.01)
*H04L 45/586* (2022.01)

(52) U.S. Cl.
CPC ............ *H04L 45/02* (2013.01); *H04L 45/586* (2013.01)

(58) Field of Classification Search
None
See application file for complete search history.

(56) References Cited

U.S. PATENT DOCUMENTS

| | | | |
|---|---|---|---|
| 2015/0280998 A1 | 10/2015 | Kitani | |
| 2017/0149712 A1* | 5/2017 | Park | H04L 45/122 |
| 2017/0324655 A1* | 11/2017 | Vasseur | H04L 45/04 |
| 2018/0309636 A1 | 10/2018 | Strom et al. | |
| 2018/0351853 A1 | 12/2018 | Usui et al. | |
| 2018/0351863 A1 | 12/2018 | Vairavakkalai et al. | |
| 2018/0351882 A1 | 12/2018 | Jeganathan et al. | |
| 2020/0186362 A1* | 6/2020 | Thubert | H04L 9/0891 |
| 2020/0287780 A1* | 9/2020 | Singh | H04L 45/66 |
| 2020/0328972 A1* | 10/2020 | Ramanujan | H04L 45/24 |
| 2020/0344162 A1* | 10/2020 | Dutta | H04L 45/745 |

(Continued)

*Primary Examiner* — Phirin Sam
(74) *Attorney, Agent, or Firm* — Tianyi He

(57) ABSTRACT

A method for generating an application-aware virtual topology (AAVT) routing table for a network device among network devices connected via a wide area network is provided. The method is executed by a network controller connected to the network and includes: receiving, from the network devices, path information of the network devices; generating, using the path information, an underlay graph specifying a path topology of the network device; generating, based on the path topology specified in the underlay graph, the AAVT routing table for the network device where the AAVT routing table includes a set of paths; and transmitting, in response to generating the AAVT routing table, the AAVT routing table to the network device to cause the network device to program the set of paths.

20 Claims, 12 Drawing Sheets

(56) References Cited

U.S. PATENT DOCUMENTS

| | | |
|---|---|---|
| 2020/0374219 A1 | 11/2020 | Saha |
| 2021/0168125 A1* | 6/2021 | Vemulpali ............. H04L 9/3236 |
| 2021/0218663 A1* | 7/2021 | Kaliyamoorthy ... H04L 41/0866 |
| 2021/0218664 A1* | 7/2021 | Tillotson ............. H04L 47/2483 |
| 2021/0306256 A1* | 9/2021 | Ward ...................... H04L 45/04 |
| 2021/0314385 A1 | 10/2021 | Pande et al. |
| 2021/0367884 A1 | 11/2021 | Drake |
| 2021/0399920 A1 | 12/2021 | Sundararajan et al. |
| 2022/0029890 A1 | 1/2022 | Mohanty et al. |
| 2022/0078103 A1* | 3/2022 | Prajapat .............. H04L 45/3065 |
| 2022/0272023 A1 | 8/2022 | Bidgoli et al. |
| 2022/0337499 A1 | 10/2022 | Mohanty et al. |
| 2023/0093190 A1 | 3/2023 | Ramachandran et al. |
| 2023/0188454 A1 | 6/2023 | Shi |
| 2023/0269169 A1 | 8/2023 | Li et al. |
| 2023/0344748 A1* | 10/2023 | Prajapat .............. H04L 12/1877 |
| 2023/0388269 A1 | 11/2023 | Yeh et al. |
| 2024/0137339 A1* | 4/2024 | Vemulpali ............. H04L 9/0825 |

* cited by examiner

SYSTEMS AND METHODS FOR CONSTRUCTING APPLICATION-AWARE VIRTUAL TOPOLOGIES IN WIDE AREA NETWORKS

CROSS-REFERENCE TO RELATED APPLICATIONS

This application is a continuation of U.S. non-provisional patent application Ser. No. 17/535,248, filed Nov. 24, 2021, which claims priority to U.S. provisional patent application No. 63/229,715, filed Aug. 5, 2021. These applications are hereby incorporated by reference herein in their entireties.

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

DETAILED DESCRIPTION

Figure 1A:
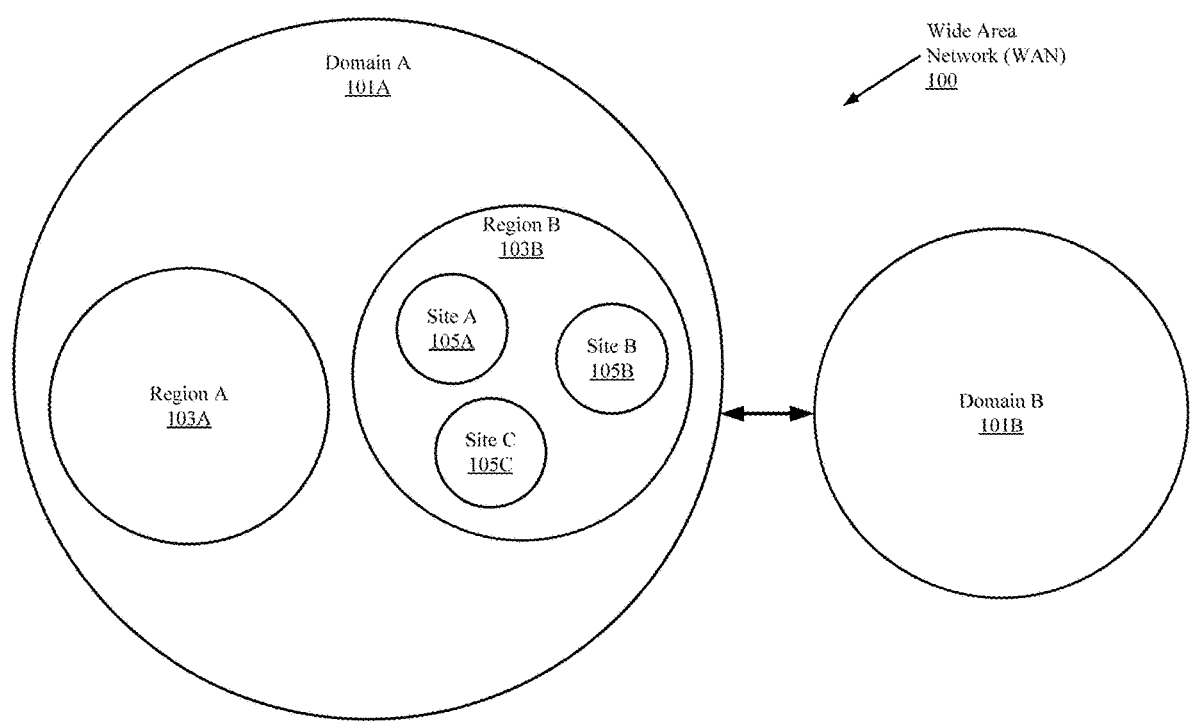
FIG. 1A shows an example of a wide area network (WAN) in accordance with one or more embodiments.

Specific embodiments will now be described with reference to the accompanying figures.

To simplify managing network policies, networks (e.g., enterprise networks, which may also be referred to as "wide area networks (WAN)") are hierarchically divided into different levels (e.g., domains, regions, sites, and network devices). The network devices are interconnected such that one network device may be connected to another network device using multiple paths (e.g., single virtual-hop paths representing a connection using a virtual tunnel link between two network devices and multiple virtual-hop paths representing a combination of two or more single-virtual hop paths) through one or more service providers (SPs). Network traffic transmitted between these network devices are engineered to be sent, using Path Selection (PS), on a path that is less congested than others. The direct (i.e., single virtual-hop) paths are discovered automatically by the network devices through exchanging their SP connectivity information (herein referred to as "reachability information") using border gateway protocol (BGP) techniques. Consequently, the network devices only know the direct paths between one another but are not aware of all possible paths (e.g., multiple hop paths) via other network devices within the network. Furthermore, even if these multiple hop paths (also referred to herein as "multiple virtual-hop paths") were to be revealed to the network devices, the network devices will still not be able to determine which paths are best-suited for specific applications (e.g., voice services, video services, large data transfers, secure data transfers, etc.) (also referred to as "application classification" in FIG. 4).

Embodiments of this disclosure provide an application-aware virtual topology (AAVT) routing table for each network device within the network that includes: (i) a set of paths including predetermined types (e.g., single virtual-hop, multiple virtual-hop, etc.) of paths (or, alternatively, all types of paths) between a network device and all other network devices in the network; and (ii) path metrics of each path of the set of paths. Consequently, using the AAVT routing table, each network device will advantageously be aware of all paths (not just being limited to single virtual-hop paths) between itself and other network devices within the network and will also be able to advantageously select the most-suitable path for a specific application to be executed.

In one or more embodiments disclosed herein, the AAVT routing table may be constructed by one or more network controllers disposed within the network. Each network controller may include a route reflector and a route identifier agent (referred to collectively as "a network controller agent"). Alternatively, the route reflector may be a distinct and separate device. A network device within the network may measure path metrics (e.g., latency, jitter, loss, total bandwidth, and current utilizations, etc.) of paths between itself and other network devices it is directly connected with (i.e., through a single virtual-hop path) using in-band techniques (e.g., BGP as discussed above).

In one or more embodiments disclosed herein, the path metrics and reachability information (herein collectively referred to as "path information") are exchanged between the route reflector and all of the network devices in the network using border gateway protocol (BGP). Alternatively, each region within the network may include a hub network device that aggregates the path information of all network devices within the region into an aggregated path information database, and transmit the aggregated path information database to the route reflector using BGP. This aggregated path information database may also include paths between the hub network device and hub network devices of other regions that are connected to the same SP.

In one or more embodiments disclosed herein, the route reflector provides the aggregated path information database to the route identifier agent of the network controller. The route identifier agent uses the aggregated path information database to generate an underlay graph representing a path topology of each region (which may include all WAN paths within one or more sites of each region). When multiple regions are interconnected using hub network devices, the route identifier agent uses the aggregated path information database from each hub network device to generate an underlay graph including the path topology across all of the regions. This underlay graph, along with each network device's policy and requirements (discussed below), is used to construct the AAVT routing table for each network device.

In one or more embodiments disclosed herein, the route identifier agent analyzes the path information to: (i) discover all single and multiple virtual-hop paths for each network device; and (ii) determine a most-suitable path (or a set of most-suitable paths) for each application being executed on each of the network devices (i.e., to compile usability information for each path of a network device) while also considering network transmission policies set for each network device. For example, a network device executing a voice application may want to utilize a path with less jitter and latency. The embodiments are not limited to this example. These path metrics may be updated periodically, e.g., every five seconds, to the route identifier agent. If the path state changes (i.e., a path between two network devices is taken down), an immediate update may be sent to the route identifier agent. In one or more embodiments, direct paths between network devices (i.e., single virtual-hop paths) through the same SP may not be included in the aggregated path information database. Consequently, the route identifier agent would only be relied upon to discover multiple virtual-hop paths between the network devices.

In one or more embodiments disclosed herein, based on analyzing the path information, the route identifier agent may program (through transmission of the AAVT routing tables using the route reflector) each network device to install one or more paths included in the underlay graph. The paths to be programmed in each network device may depend on the requirements (e.g., types of applications being handled, security policy, reachability requirements, multi-hop metrics support, etc.) of each network device (herein collectively referred to as "network device information and policies").

Various embodiments of the disclosure are described below.

FIG. 1A shows an example wide area network (WAN) (100) in accordance with one or more embodiments disclosed herein. The WAN (100) may be a telecommunications network that extends over a large geographic area for implementing computer networking features. As shown in FIG. 1A, the WAN (100) may be divided into a hierarchy including, but not limited to, domains (101A, 101B), regions (103A, 103B), and sites (105A-105C). As one example, each domain (101A, 101B) may cover a continent (e.g., North America, Europe, etc.), each region (103A, 103B) may cover some or more states, cities, and/or provinces within the domain (101A, 101B), and each site may represent a physical location (and or virtual instance thereof) (e.g., a building such as an office, school, hospital, etc.) within a region (103A, 103B).

Although the WAN (100) of FIG. 1A is shown as having only two domains (101A, 101B), two regions (103A, 103B), and three sites (105A, 105C), one of ordinary skill in the art would appreciate that the WAN (100) may have any number of each of these components without departing from the scope of one or more embodiments herein. Additionally, different terms and/or examples may be used to describe each hierarchical level of the WAN (100) without departing from the scope of one or more embodiments. For example, a domain may cover a portion of (e.g., half) of a continent rather than a full area of the continent.

In one or more embodiments, each domain (101A, 101B), region (103A, 103B), and site (105A-105C) of the WAN (100) may include network devices (discussed in more detail below in FIG. 1B) that are able to communicate (e.g., transfer information in the form of network traffic such as data packets) with one another using one or more service providers (e.g., 119A, 119N). As an example, each site (105A-105C) may include one or more branch network devices (e.g., 111A, 111N, FIG. 1B). Each region (103A, 103B) may include at least one hub network device (e.g., 113A-113N, FIG. 1B) as a relay point for the branch network devices of that region to communicate with network devices in other regions (including regions of other domains). The hub network device may also be located at one of the sites (105A-105C) along with one or more of the branch network devices. Additionally, each domain (101A, 101B) may have a network controller (e.g., 115, FIG. 1B) in charge of controlling and/or monitoring the network devices within that domain.

A more detailed example of the WAN (100) structure with network devices included within each level of the WAN (100) hierarchy is provided below in reference to FIG. 3A.

Figure 1B:
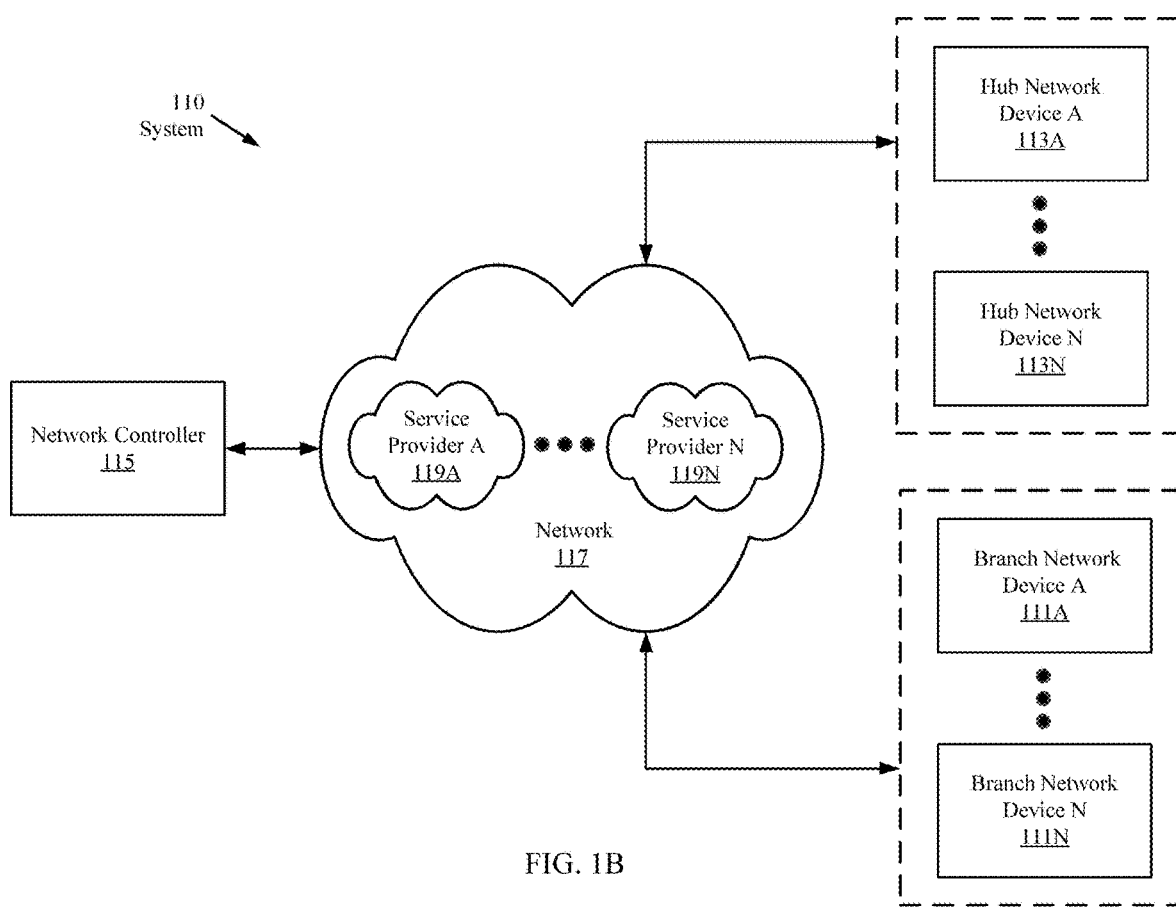
FIG. 1B shows a system in accordance with one or more embodiments described herein.

FIG. 1B shows a system (110) in accordance with one or more embodiments of the disclosure. As discussed above, the system (110) may include components that are physically located within each hierarchical level of the WAN (100). In particular, the system (110) includes one or more branch network devices (111A, 111N), one or more hub network devices (113A, 113N), and a network controller (115) that are connected through a network (117) composed of one or more service providers (119A, 119N). Each of these components is described below.

In one or more embodiments disclosed herein, the one or more branch network device(s) (111A, 111N) are physical devices that include persistent storage, memory (e.g., random access memory), one or more processor(s) (including a switch chip), and two or more physical ports. Examples of the branch network devices (111A, 111N) include, but are not limited to, a router, a switch, a top of rack (TOR) switch, and a multilayer switch that are connected to one or more client devices (not shown) (e.g., computers, laptops, smartphones, tablets, etc.). As discussed above, in the context of the WAN (100) in FIG. 1A, each site (105A-105C) of the WAN (100) may include one or more of the branch network devices (111A, 111N). The branch network devices (111A, 111N) are not limited to the aforementioned specific examples.

The switch chip is hardware that determines which egress port on a branch network device (111A, 111N) to forward packets (which may be in the form of media access control (MAC) frames). The switch chip may include egress and ingress ports that may connect to ports on the branch network device (111A, 111N). Each port may or may not be connected to another device (e.g., a server, a switch, a router, etc.). The branch network device (111A, 111N) may be configured to receive the packets via the ports.

Additionally, the persistent storage in the branch network devices (111A, 111N) may include any type of non-transitory computer readable medium that stores data. For example, the data in the persistent storage may be instructions, which, when executed by one or more processor(s) in the branch network device (111A, 111N), enable the branch network device (111A, 111N) to perform one or more functions of the branch network device (111A, 111N).

In one or more embodiments disclosed herein, similar to the branch network devices (111A, 111N), the one or more hub network devices (113A, 113N) are physical devices that include persistent storage, memory (e.g., random access memory), one or more processor(s), and two or more physical ports. Examples of the hub network devices (113A, 113N) include, but are not limited to, a hub router that connects and manages one or more branch network devices (111A, 111N). For example, a hub network device (113A, 113N) may be configured as a network hub that broadcasts data to every branch network device (111A, 111N) that is connected to the hub network device (113A, 113N). As discussed above, in the context of the WAN (100) in FIG. 1A, each region (103A, 103B) may include at least one hub network device (113A, 113N) that is connected to each of the branch network devices (111A, 111N) at the sites (105A-105C) within the region (103A, 103B). For example, for region B (103B) with multiple sites (105A-105C), the hub network device (113A, 113N) may be located at one of the sites (105A-105C) within region B (103B). The at least one hub network device (113A, 113N) is configured as the point of communication for that region with network devices disposed in other regions of the enterprise network. The hub network devices (113A, 113N) are not limited to the aforementioned specific examples.

In one or more embodiments disclosed herein, the network controller (115) is a physical or virtual device that may be used for performing various embodiments of the disclosure (see e.g., FIGS. 2A-3C). The physical device may correspond to any physical system (e.g., the computing system of FIG. 5) with functionality to implement the various embodiments of the disclosure. For example, the physical device may be a server (i.e., a device with at least one or more processor(s), memory, and an operating system) that is connected (e.g., directly connected or indirectly connected) via the network connected to the hub network devices (113A, 113N) and the branch network devices (111A, 111N) (through the hub network devices (113A, 113N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment disclosed herein, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

As discussed above, in the context of the WAN (100) in FIG. 1A, each domain (101A, 101B) may include a single network controller (115). However, one or more embodiments disclosed herein is not limited to this configuration. For example, each domain (101A, 101B) may include multiple ones of the network controller (115) and each region (103A, 103B) with multiple sites (105A-105C) may also include one or more of the network controller (115). In general, the WAN (100) may include any number of network controllers (115) at any hierarchical level of the WAN (100) without departing from the scope of one or more embodiments disclosed herein as long as each network controller (115) is configured to control and/or monitor a group of network devices (e.g., the hub network devices (113A, 113N) and the branch network devices (111A, 111N).

Additional details of the network controller (115) are discussed below in reference to FIG. 1C.

In one or more embodiments disclosed herein, the network (117) may be the medium through which the branch network devices (111A, 111N), the hub network devices (113A, 113N), and the network controller (115) are connected within the WAN (100). In one embodiment of the disclosure, the network may include other network devices (or systems) (not shown) that facilitate communication between the aforementioned components. As such, in one embodiment of the disclosure, the network may include any combination of local (e.g., local area network (LAN) and/or WAN segments that may be wire-based and/or wireless and that may use any combination of wired and/or wireless communication protocols.

In one or more embodiments disclosed herein, the network (117) may include one or more service providers (SPs) (119A, 119N) that provide the branch network devices (111A, 111N), the hub network devices (113A, 113N), and the network controller (115) access to the network (117). For example, the service providers (119A, 119N) may be private (e.g., multiprotocol label switching (MPLS) providers) or public (e.g., internet service providers (ISPs)) service providers. The service providers (119A, 119N) are not limited to the aforementioned specific examples and may also include other types of service providers such as, for example, telecommunication service providers.

Figure 1C:
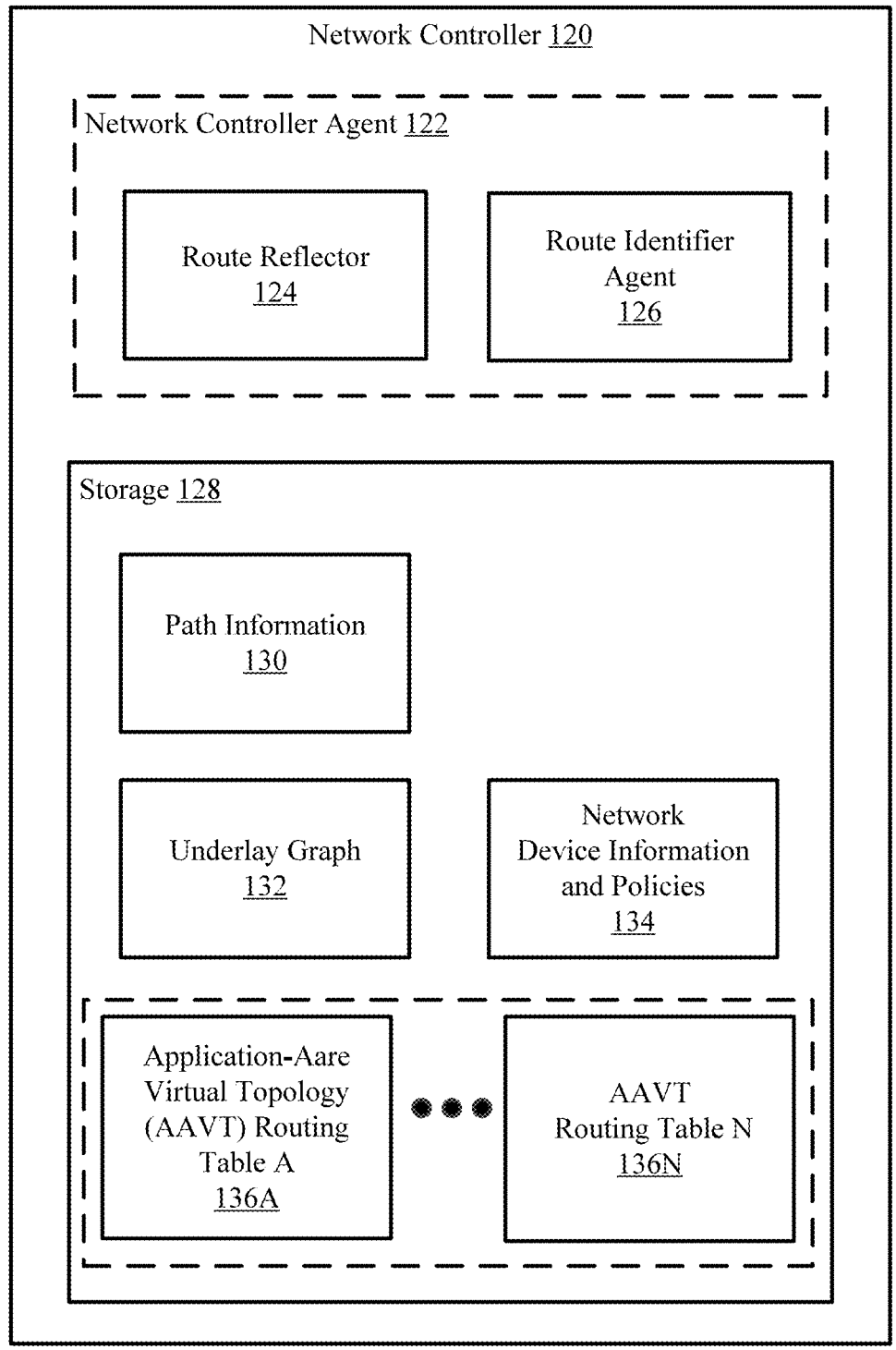
FIG. 1C shows a diagram of a network controller in accordance with one or more embodiments disclosed herein.

FIG. 1C shows an example network controller (120) in accordance with one or more embodiments of the disclosure. The network controller (120) may be the network controller (115) discussed above in reference to FIG. 1B. In addition to the components discussed above in reference to FIG. 1B, the network controller (120) further includes a route reflector (124), a route identifier agent (126), and a storage (128). The network controller (120) may include additional, fewer, and/or different components without departing from the disclosure. Each of the components illustrated in FIG. 1C is described below.

In one or more embodiments disclosed herein, the route reflector (124) may be configured in hardware (e.g., circuitry), software, or any combination thereof. The route reflector (124) uses border gateway protocol (BGP) techniques to learn about the paths between each device (e.g., the branch network devices (111A, 111N), the hub network devices (113A, 113N), and the controller (115)) within the network (e.g., 117, FIG. 1B). For example, each of the devices within the network is configured for BGP and a BGP session is established between each of the devices and the route reflector (124). Although the route reflector (124) is shown as being part of the network controller (120) in FIG. 1C, one of ordinary skill in the art would appreciate that one or more embodiments disclosed herein is not limited to such a configuration. For example, the route reflector (124) may be provided external to the network device (120) as a separate and independent component that is connected, (e.g., directly connected or indirectly connected) to the network controller (120).

In one or more embodiments disclosed herein, the route identifier agent (126) may be configured in hardware (e.g., circuitry), software, or any combination thereof. The route identifier agent (126) interacts with the other components (e.g., the route reflector (124) and storage (128)) of the network controller (120) to facilitate the implementation of one or more protocols, services, and/or features of the network controller (120). For example, the route identifier agent (126) may be used for performing one or more steps of processes in accordance with various embodiments of the disclosure (e.g., the processes discussed below in FIGS. 2C-2D) for generating a virtual topology for each of the network devices (e.g., the branch network devices (111A, 111N), the hub network devices (113A, 113N)) on the network. Additional details of the route identifier agent (126) are discussed below in FIGS. 2B-3C.

In one or more embodiments disclosed herein, when the route reflector (124) is included as part of the network controller (120), the combination of the route reflector (124) and the route identifier agent (126) is collectively referred to as the network controller agent (122). In such a configuration, the route reflector (124) and the route identifier agent (126) may be configured in hardware (e.g., circuitry), software, or any combination thereof as a single component within the network controller (120) that performs the functions of both the route reflector (124) and the route identifier agent (126).

In one or more embodiments disclosed herein, the storage (128) is implemented using devices that provide data storage services (e.g., storing data and providing copies of previously stored data). For example, storage (128) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

In one or more embodiments disclosed herein, the storage (128) is configured to store at least path information (130), an underlay graph (132), network device information and policies (134), and one or more AAVT routing tables (136A, 136N). Each of these components stored in the storage (128) is described below.

In one or more embodiments disclosed herein, the path information may include reachability information and path metrics. The path information (130) may be stored in the form of a data structure (e.g., a list, table, etc.). In one or more embodiments, the reachability information may include the paths between each of the network devices of the network discovered through BGP using the route reflector (124). Each of these paths making up the reachability information may be single virtual-hop paths. In the context of this disclosure, a single virtual-hop path constitutes a direct connection (through a service provider of the network) between a first network device to second network device without the need of going through a third network device. Said another way, using a single virtual-hop path, the first network device may send network traffic directly to the second network device without having to route the network traffic through the third network device. An example of a single virtual-hop path is shown below in FIG. 3C (e.g., path P1, FIG. 3C).

In one or more embodiments disclosed herein, the path metrics of the path information may include information specifying one or more properties of the path that reflects a quality of the path. For example, the path metrics may include, but are not limited to: latency, jitter, loss, total bandwidth, and current utilizations, etc. In one or more embodiments, the path metrics of each path in the network may be obtained using in-band (e.g., measured properties of a path are piggy backed on existing network traffics) and out-of-band techniques (e.g., synthetic probes with difference quality of service (QOS) marking for measuring latency, jitter, loss, etc.) and transmitted to the network controller using BGP. An example of a multiple virtual-hop path is shown below in FIG. 3C (e.g., path P2, FIG. 3C).

In one or more embodiments disclosed herein, the underlay graph (132) stored in the storage (128) may specify a path topology between the network devices (e.g., the branch network devices (111A, 111N), the hub network devices (113A, 113N), and the network controller (115)) connected on the network. The underlay graph (132) may be stored in the form of a pictorial graph and/or a data structure (e.g., a list, table, etc.). The path topology in the underlay graph (132) shows all of the connections between each of the network devices connected on the network, and further specifies the service provider that provides the connections. This allows multiple virtual-hop paths (i.e., paths made up of multiple single virtual-hop paths) to be discovered within the underlay graph (132).

As an example, assume that a hub network device is connected to two branch network devices (branch A and branch B). The hub network device is connected to branch B through the Internet, the hub network device is further connected to both branch A and branch B through MPLS, and branch A is connected to branch B through MPLS. A pictorial representation of this example connection is shown in the implementation example discussed below in reference to FIG. 3A. The underlay graph (132) for these three network devices may be a pictorial graph showing the three network devices with a line from the hub network device to branch B to show the Internet connection and another line from branch A to branch B showing the MPLS connection. A line also extends from the hub network device to each of branch A and branch B showing the MPLS connection. Such an underlay graph (132) shows that branch A may communicate with the hub network device using a single virtual-hop path through the MPLS connection or through a multiple virtual-hop path (using a combination of the MPLS and the Internet) by going through branch B. Although a specific example of the underlay graph (132) is provided above, one of ordinary skill in the art would appreciate that other variations (e.g., ones that use different line styles and line colors, ones illustrated in table format, etc.) of the underlay graph (132) are possible without departing from the scope of one or more embodiments as long as the underlay graph (132) accurately illustrates all of the connections between all of the network devices connected on the network.

In one or more embodiments, multiple ones of the underlay graph (132) may be stored in the storage (128). For example, assume that a network is an enterprise network divided into domains, regions, and sites. An underlay graph (132) may be generated for each layer of the enterprise network hierarchy.

In one or more embodiments disclosed herein, the network device information and policies (134) stored in the storage (128) may include information specifying a functionality of each of the network devices (e.g., the branch network devices (111A, 111N), the hub network devices (113A, 113N)). For example, network device information and policies (134) may include, but is not limited to, information specifying the applications to be executed by a network device, the network device's security policies (e.g., security policy preventing sensitive data from going over public networks), the network device's reachability requirements (e.g., information specifying how the network device restricts or limits communication with other network devices), whether the network device supports multiple virtual-hop (i.e., the network device's multiple virtual-hop metrics support), etc. In one or more embodiments, the network device information and policies (134) may be stored in the form of a data structure (e.g., a list, table, etc.).

In one or more embodiments disclosed herein, the AAVT routing table(s) (136A, 136N) stored in the storage (128) may include information (e.g., in the form of a routing table) specifying all possible paths between a network device among the network devices (e.g., the branch network devices (111A, 111N), the hub network devices (113A, 113N)) to another one of the network devices. In one or more embodiments, a path in the AAVT routing table (136A, 136N) may include the set of network devices and individual links (e.g., the specific ingress/egress port of a network device) connecting the network devices. In one or more embodiments, the path may comprise an ordered set of local links on each network device that the path traverses. An example of an AAVT routing table is shown below in reference to FIG. 4.

In one or more embodiments, the AAVT routing table(s) (136A, 136N) may also include usability information specifying which of the paths between a network device and another network device is best-suited for a particular application and/or policy (e.g., based on the network device information and policies (134) of the network device) to be executed by the network device. This advantageously prioritizes the constraints of each path between the network devices to leverage all of the service provider connections for delivering the best application performance at the lowest cost.

In one or more embodiments, an AAVT routing table (136A, 136N) is generated (e.g., by the route identifier agent) for each of the network devices connected on the network. The AAVT routing tables (136A, 136N) may be stored in the form of a data structure (e.g., a list, table, etc.).

Although FIG. 1C is described using BGP as a specific example, one of ordinary skill in the art would appreciate that other network techniques that are able to retrieve information equivalent to the path information (130) may be utilized without departing from the scope of one or more embodiments described herein.

Furthermore, one skilled in the art will recognize that the architecture of the system (100), of the network controller (120), and of the network (117) is not limited to the components shown in FIGS. 1B and 1C. For example, the network may include any number and any type of network devices participating in the sharing of data. Further, the network controller (120) may include components (e.g., a processor) not shown in FIG. 1C.

Figure 2A:
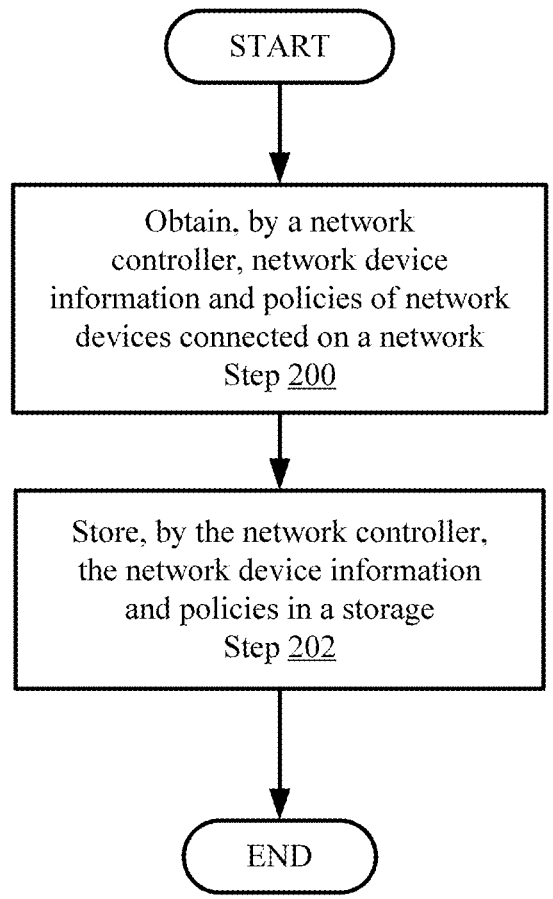
FIG. 2A shows a flowchart in accordance with one or more embodiments described herein.

FIG. 2A shows a flowchart of a method in accordance with one or more embodiments of the disclosure. The method depicted in FIG. 2A may be performed to configure a network controller (e.g., 115, FIG. 1B; 120, FIG. 1C) with the network device information and policies of each network device (e.g., the branch network devices (111A, 111N), the hub network devices (113A, 113N)) connected on the network. The method shown in FIG. 2A may be performed by, for example, the network controller agent (e.g., 122, FIG. 1C) of the network controller. Other components of the systems in FIGS. 1B-1C may perform all, or a portion, of the method of FIG. 2A without departing from the scope of this disclosure.

While FIG. 2A is illustrated as a series of steps, any of the steps may be omitted, performed in a different order, additional steps may be included, and/or any or all of the steps may be performed in a parallel and/or partially overlapping manner without departing from the disclosure.

In Step 200, the network controller obtains network device information and policies (e.g., 134, FIG. 1C) of each network device (e.g., the branch network devices (111A, 111N), the hub network devices (113A, 113N)) connected on the network. In one or more embodiments, the network device information and policies of each branch network device (e.g., 111A-111N, FIG. 1B) may first be transmitted to a hub network device (e.g., 113A-113N, FIG. 1B) in charge of the branch network devices. The hub network device aggregates all of the received network device information and policies with its own network device information and policies to obtain an aggregated network device information and policies. The aggregated network device information and policies is then transmitted by the hub network device to the network controller.

In Step 202, after obtaining the network device information and policies, the network controller stores the obtained network device information and policies in a storage (e.g., 128, FIG. 1C). In one or more embodiments, the network device information and policies obtained by the network controller will subsequently be used during the generation of the AAVT routing tables (e.g., 136A-136N, FIG. 1C), which is described in more detail below in reference to FIGS. 2B-2D.

Figure 2B:
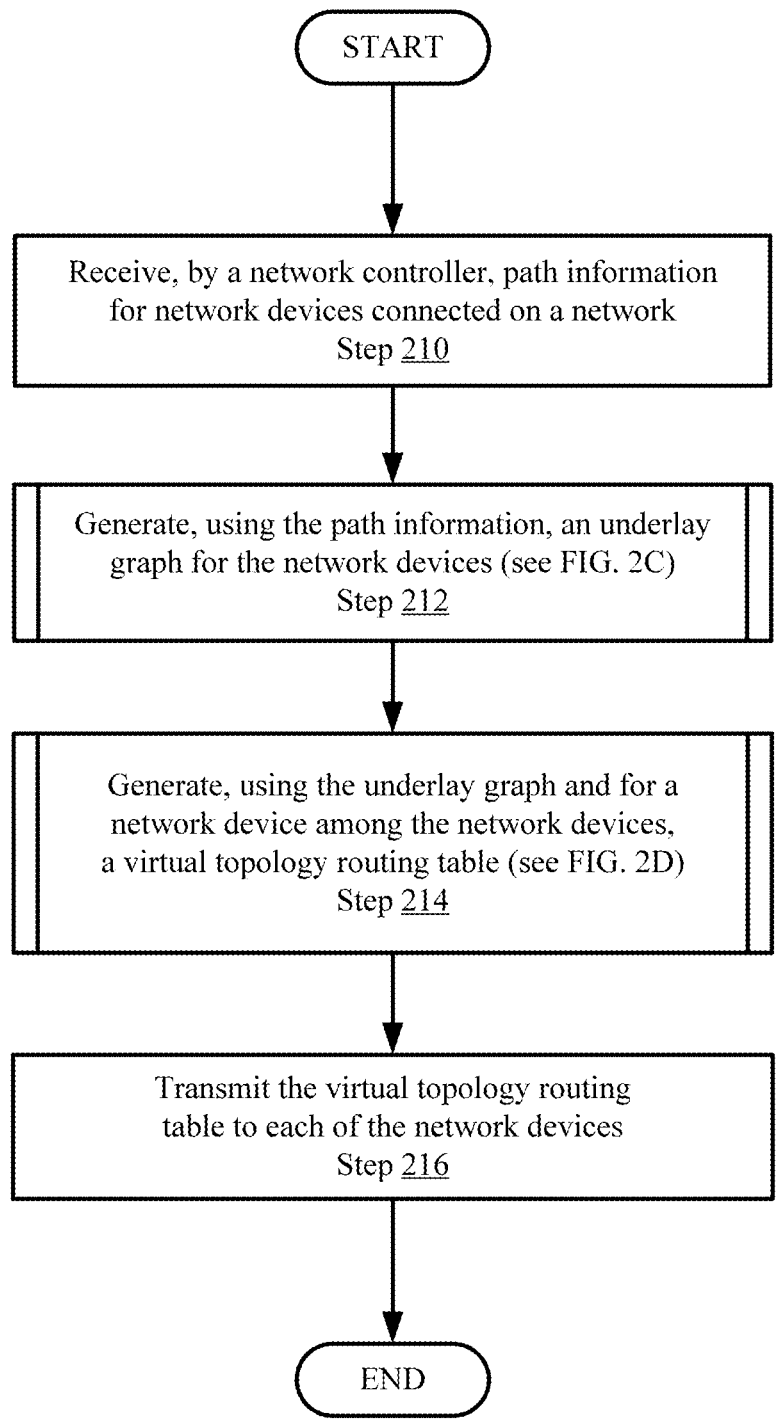
FIGS. 2B-2D show flowcharts describing a method for generating virtual topologies in accordance with one or more embodiments described herein.
Figure 2C:
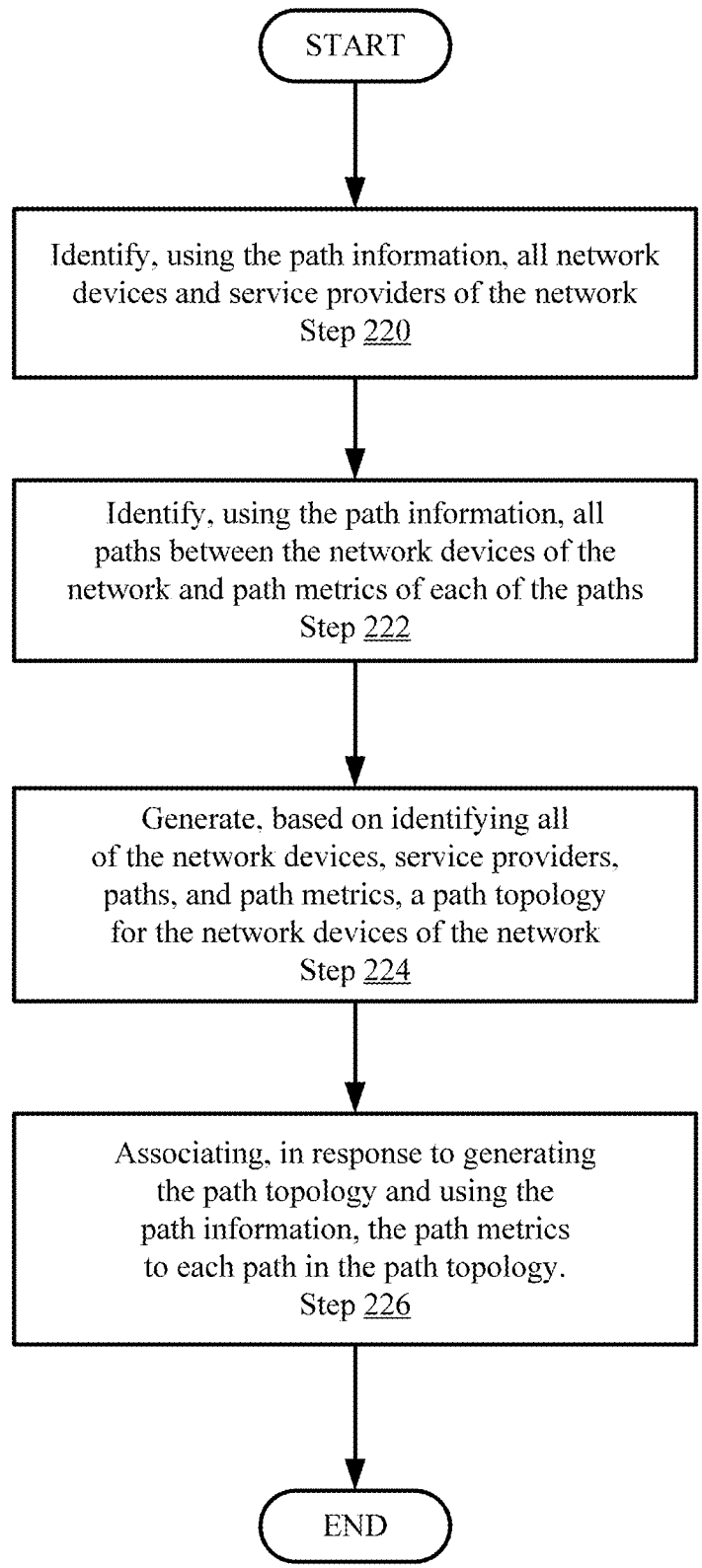
Figure 2D:
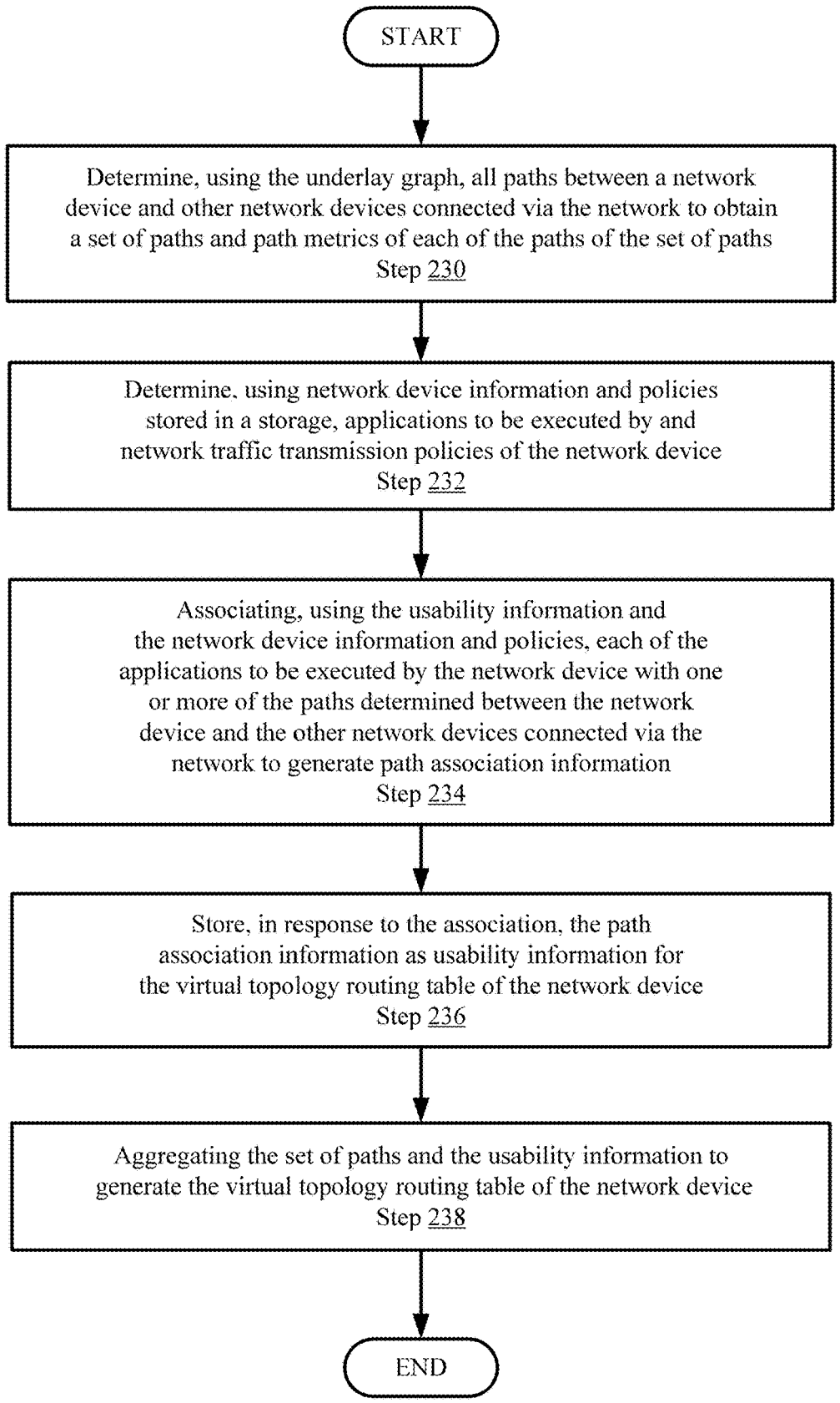

FIGS. 2B-2D show flowcharts of a method in accordance with one or more embodiments of the disclosure. The method depicted in FIGS. 2B-2D may be performed to generate an AAVT routing table for each network device (e.g., the branch network devices (111A, 111N), the hub network devices (113A, 113N)) connected on the network. The method shown in FIGS. 2B-2D may be performed by, for example, the network controller agent (e.g., 122, FIG. 1C) of the network controller. Other components of the systems in FIGS. 1B-1C may perform all, or a portion, of the method of FIGS. 2B-2D without departing from the scope of this disclosure.

While FIGS. 2B-2D are illustrated as a series of steps, any of the steps may be omitted, performed in a different order, additional steps may be included, and/or any or all of the steps may be performed in a parallel and/or partially overlapping manner without departing from the disclosure.

Starting with FIG. 2B, in Step 210, the network controller receives path information (e.g., 130, FIG. 1C) for network devices connected on a network. In one or more embodiments, the path information may be retrieved by the route reflector (e.g., 124, FIG. 1C) of the network controller agent using, for example, BGP techniques. Additionally, each of the branch network devices may first transmit their respective path information (discovered through, for example, BGP sessions between one another) to a hub network device. The hub network device may aggregate all of the received path information into an aggregated path information database, and subsequently transmits the aggregated path information to the network controller through, for example, a BGP session.

In Step 212, the network controller uses the path information received in Step 210 to generate an underlay graph (e.g., 132) for the network devices. In one or more embodiments, in the event that the network controller includes the route reflector, the path information is relayed from the route reflector to the route identifier agent (e.g., 126, FIG. 1C). The route identifier agent then uses the reachability information included in the path information to generate the underlay graph. Additional details of Step 212 with respect to generating the underlay graph are described below in the flowchart of FIG. 2C.

In Step 214, using the underlay graph generated in Step 212, the network controller generates an AAVT routing table for each of the network devices (e.g., the branch network devices (111A, 111N), the hub network devices (113A, 113N)) connected to the network. This process is described in more detail below in the flowchart of FIG. 2D.

In Step 216, the network controller transmits the AAVT routing tables to each of the respective network devices connected to the network. In one or more embodiments, the network controller may transmit the AAVT routing tables through the route reflector.

In one or more embodiments, the network controller may also transmit instructions for each network device to program all of the paths included in each of the respective AAVT routing tables. The paths to be programmed in each network device may depend on the network device information and policies. For example, assume that a network device includes network device information and policies specifying that all network traffic must pass through a firewall service within the network. All single virtual-hop and multiple virtual-hop paths in the AAVT routing table that do not traverse the firewall service will not be programmed into the network device. As another example, assume that the network is an enterprise network and the enterprise network is configured such that inter-region network traffic can only be received and transmitted through the hub network device. Said another way, a branch network device A of one region can only send network traffic to a branch network device B of another region by going through the hub network devices of the two regions. For communications between branch network device A and branch network device B, only paths that go through the hub network devices will be programmed in branch network devices A and B.

In one or more embodiments, the network controller may program a network device (through the instructions sent with the AAVT routing table) using, for example, a stack of paths (e.g., virtual paths representing a connection using a virtual tunnel link between two network devices) representing a trajectory of the packet through the network to optimize the path(s) utilized by the network device for specific network traffic. An example of the stack of paths is shown below in reference to FIG. 4. Other methods of programming a network device to use the paths included in the AAVT routing tables may also be used without departing from the scope of this disclosure.

Turning now to FIG. 2C, in Step 220, the network controller uses the path information obtained in Step 210 of FIG. 2B to identify all network devices and service providers of the network. In one or more embodiments, all of the branch network devices, the hub network devices, and the service providers connecting the branch network devices and the hub network devices are identified using the path information.

In Step 222, all paths between the network devices identified in Step 220 are identified using the path information (namely, the reachability information included in the path information). The path information is also parsed to identify (i.e., obtain) the path metrics of each of the identified paths.

In Step 224, once all of the network devices, service providers, paths, and path metrics are identified in Steps 220 and 222, the network controller uses all of the obtained information to generate a path topology for the network devices connected to the network. In one or more embodiments, as discussed above in reference to FIG. 1C, the underlay graph is generated using and includes all of the paths (including all single virtual-hop and multiple virtual-hop paths) between each of the network devices connected to the network. Alternatively, in one or more embodiments, the underlay graph may be generated to include only multiple virtual-hop paths between the network devices (i.e., all single virtual-hop paths that do not make up part of a multiple virtual-hop path are excluded from the path topology). Examples of multiple virtual-hop and single virtual-hop paths are shown in FIGS. 3A-3C. This may be done, for example, in the above-discussed example where a network is configured such that inter-region network traffic can only be received and transmitted through the hub network device.

In Step 226, once the path topology is generated, the network controller associates each path metrics identified in Step 222 with each of the paths included in the path topology. The underlay graph is generated (in Step 226) (e.g., once the association of the path metrics with each of the paths included in the path topology is completed) based on this path topology.

Turning now to FIG. 2D, in Step 230, the network controller uses the underlay graph generated in Step 212 of FIG. 2B to determine (i.e., identify) all paths between a network device (e.g., a branch network device) and all other network devices connected via the network. In one or more embodiments, all of the identified paths are stored as a set of paths for the AAVT routing table of the network device. In Step 230, the path metrics of each of the paths in the set of the paths are also identified.

In Step 232, the network controller uses the network information and policies of the network device (obtained in Step 200 of FIG. 2A) to determine all applications (e.g., voice applications, video applications, streaming applications, etc.) to be executed by the network device. The network controller also uses the network information and policies of the network device to determine network traffic transmission policies of the network device.

In Step 234, the information obtained in Steps 230 and 232 are associated with one another to generate path association information. In one or more embodiments, the path association information may be obtained by associating one or more of the applications and/or policies to be executed by the network device to one or more of the paths in the set of paths.

For example, in one or more embodiments, the network controller may make a first determination that the network device executes voice applications (e.g., voice calls through web communication applications). The network controller may then make a second determination, based on the set of paths and the path metrics, that one of the paths among the set of paths has the least jitter and is best suited for the voice applications. As part of the second determination, the network controller may also determine that the best-suited path is a multiple virtual-hop path. In response, the network controller makes a third determination based on the network traffic transmission policies of the network device that the network device supports network traffic transmission using multiple virtual-hop paths. As a result, the voice applications of the network device are now associated with this multiple virtual-hop path among the set of paths that has the least jitter.

In Step 236, the network controller may store the path association information in the storage as the usability information to be included in the AAVT routing table of the network device. Furthermore, in response to obtaining the set of paths and the usability information, the network controller aggregates (in Step 238) these two information into the AAVT routing table of the network device.

In one or more embodiments disclosed herein, the AAVT routing table of the network device generated in Step 238 may include all of the paths within the set of paths. Alternatively, in one or more embodiments, based on the path metrics and the network information and policies information, the network controller may filter down the set of paths to a predetermined number (e.g., two (2)) of best-suited paths for the network device to utilize. The AAVT routing table generated will then only include the predetermined number of best-suited paths.

In one or more embodiments disclosed herein, the process in the flowchart of FIG. 2D is repeated for each of the network devices connected on the network. Additionally, because the network is constantly changing, the network controller may be configured to dynamically generate a new AAVT routing table for each of the network devices after a predetermined amount of time has elapsed since the generation of the previous AAVT routing table.

Figure 3A:
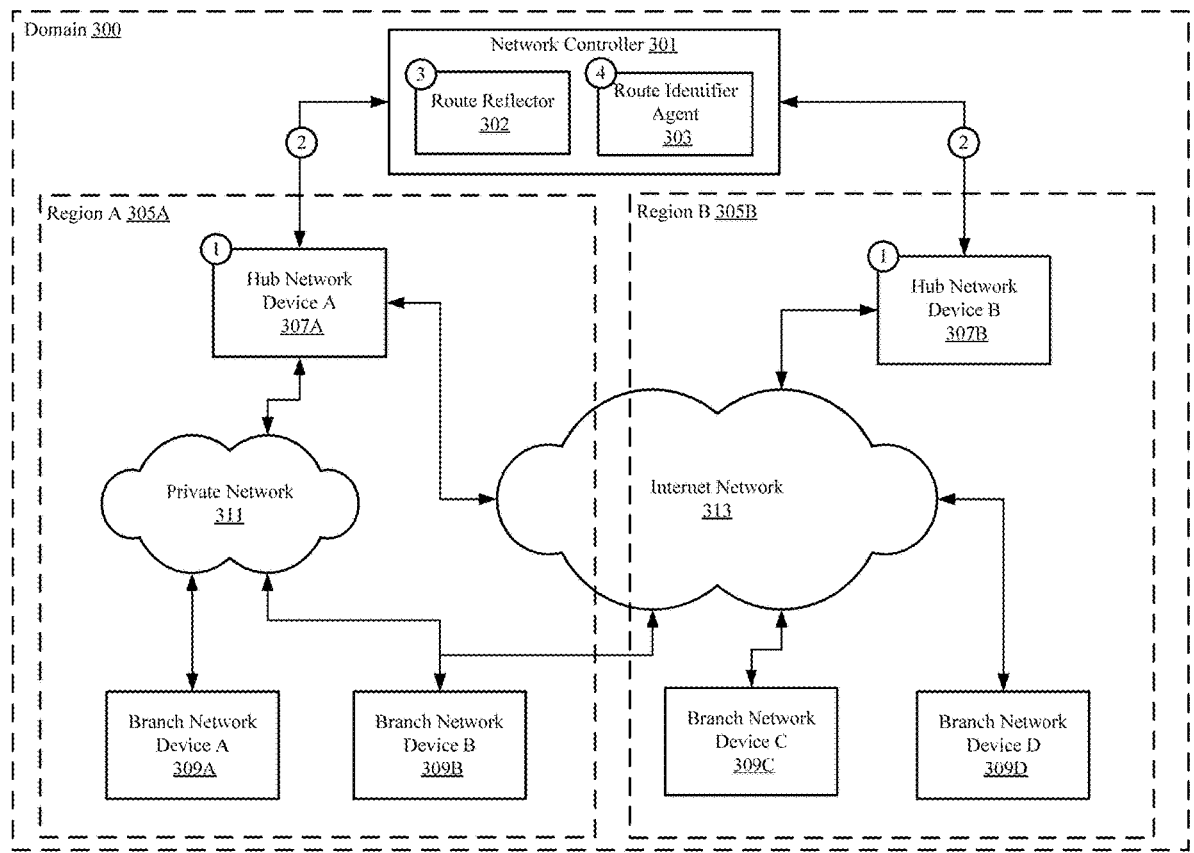
FIGS. 3A-3C show an example in accordance with one or more embodiments described herein.
Figure 3B:
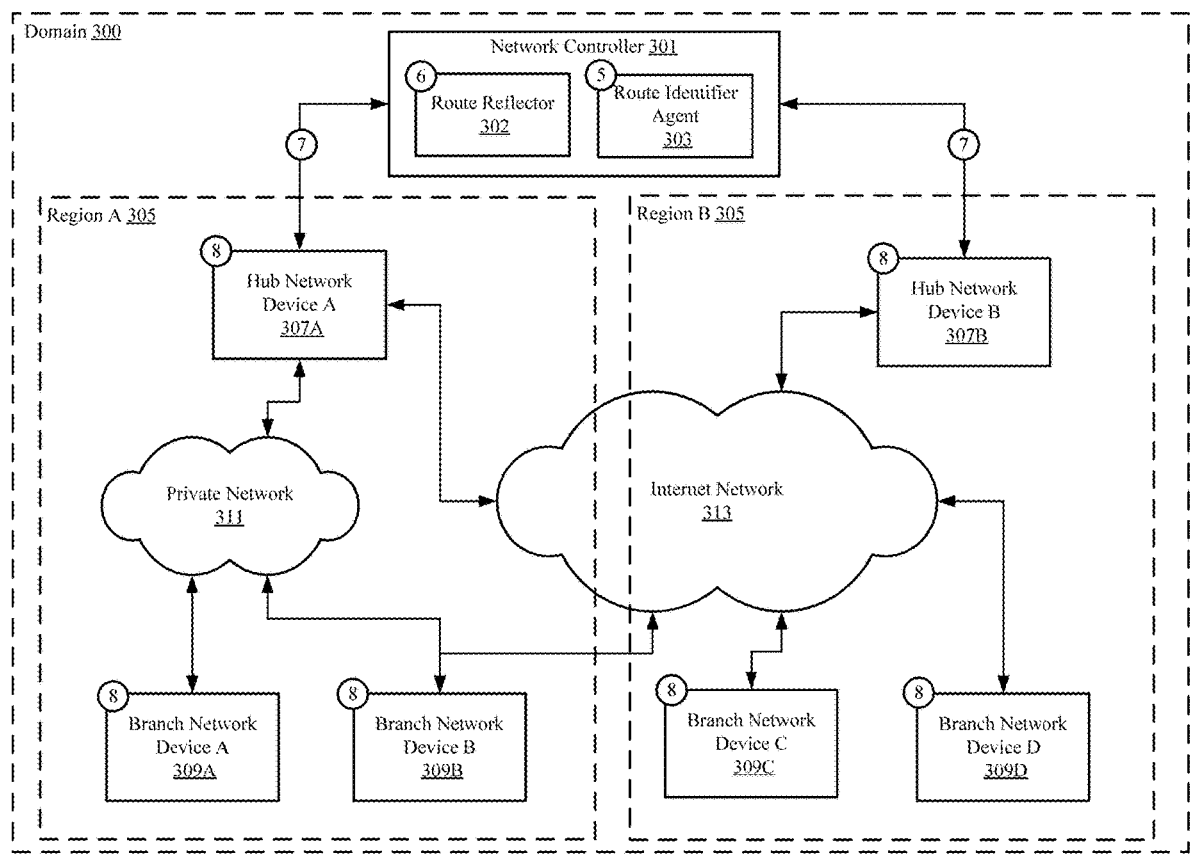
Figure 3C:
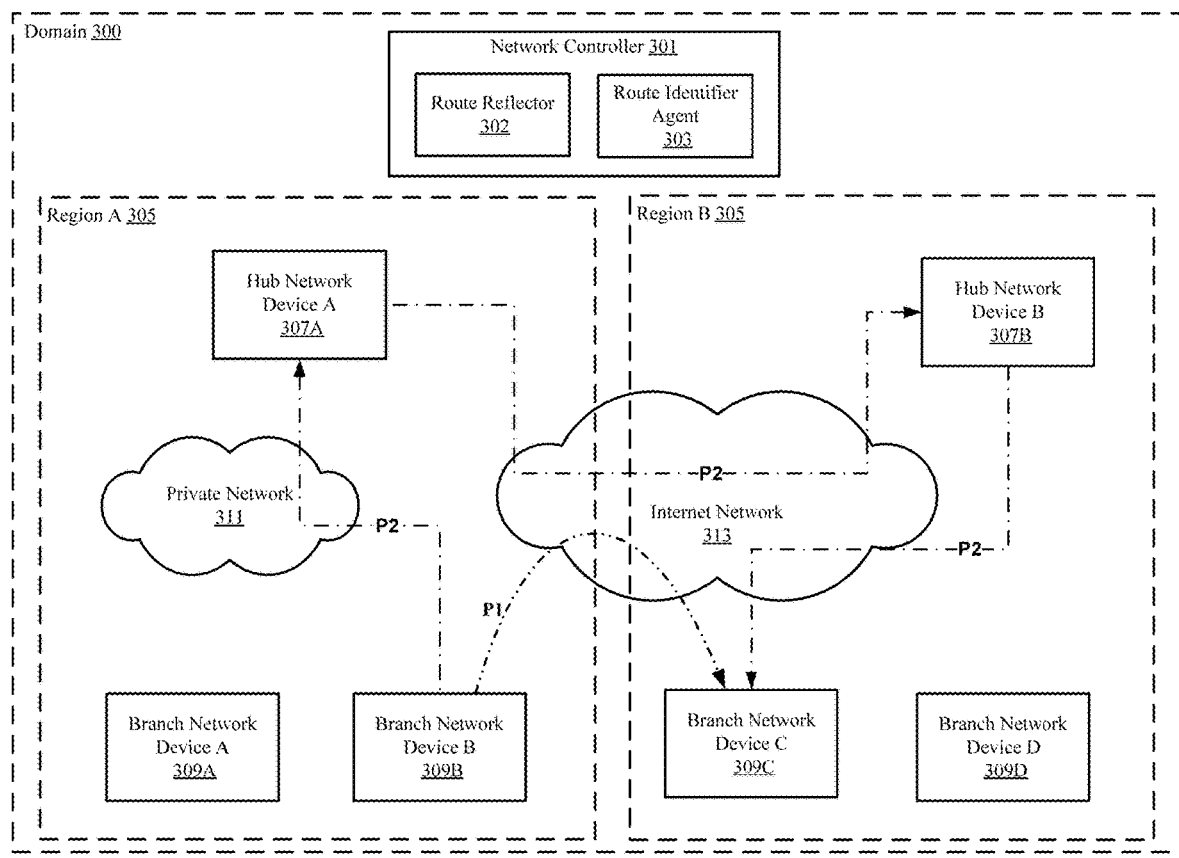

To further clarify embodiments of the disclosure, an example is provided in FIGS. 3A-3C. The numbers in the brackets below, e.g., "[1]", correspond to the same circled numbers in FIGS. 3A-3C.

Start of Example

Initially, assume that a WAN (e.g., 100, FIG. 1A) has a domain (300) with a topology shown in FIG. 3A. Further assume that the domain (300) is configured to include a single network controller (301) that is in charge of generating a AAVT for each of the network devices in the domain (300). To generate an AAVT for each network device in domain (300), first, hub network device A (307A) and hub network device B (307B) receive path information from branch network devices (309A-309D) of their respective regions (i.e., region A (305A) and region B (305B) and aggregates the path information into aggregated path information databases [1]. The aggregated path information databases are transmitted to the network controller (301) [2]. The aggregated path information databases are received by the route reflector (302) and transmitted to the route identifier agent (303) [3]. The route identifier agent (303) uses the aggregated path information databases to generate an AAVT routing table for each of the branch network devices (309A-309D) and each of the hub network devices (307A and 307B) [4].

Turning now to FIG. 3B, after the AAVT routing tables are generated, the route identifier agent (303) provides the AAVT routing tables to the route reflector (302) [5]. The route reflector (302) receives the AAVT routing tables from the route identifier agent (303) [6]. The route reflector (302) transmits (or otherwise provides) the AAVT routing tables to each of the branch network devices (309A-309D) and each of the hub network devices (307A and 307B) [7]. Upon receiving the AAVT routing tables, each of the branch network devices (309A-309D) and each of the hub network devices (307A and 307B) programs paths identified in their respective AAVT routing tables [8].

Finally, as seen in FIG. 3C, after receiving the AAVT routing table, branch network device B (309B) installs two different paths to reach branch network device C (309C): (i) path P1 as a direct single virtual-hop path using internet network (313); and (ii) path P2 as a multiple virtual-hop path through hub network device A and hub network device B (307A and 307B) utilizing internet network (313). The AAVT routing table will also provide branch network device B (309B) with information regarding which of the two paths (e.g., path P1 and path P2) are best suited for specific applications and/or for specific network traffic transmission policies to be executed by branch network device B (309B).

End of Example

Figure 4:
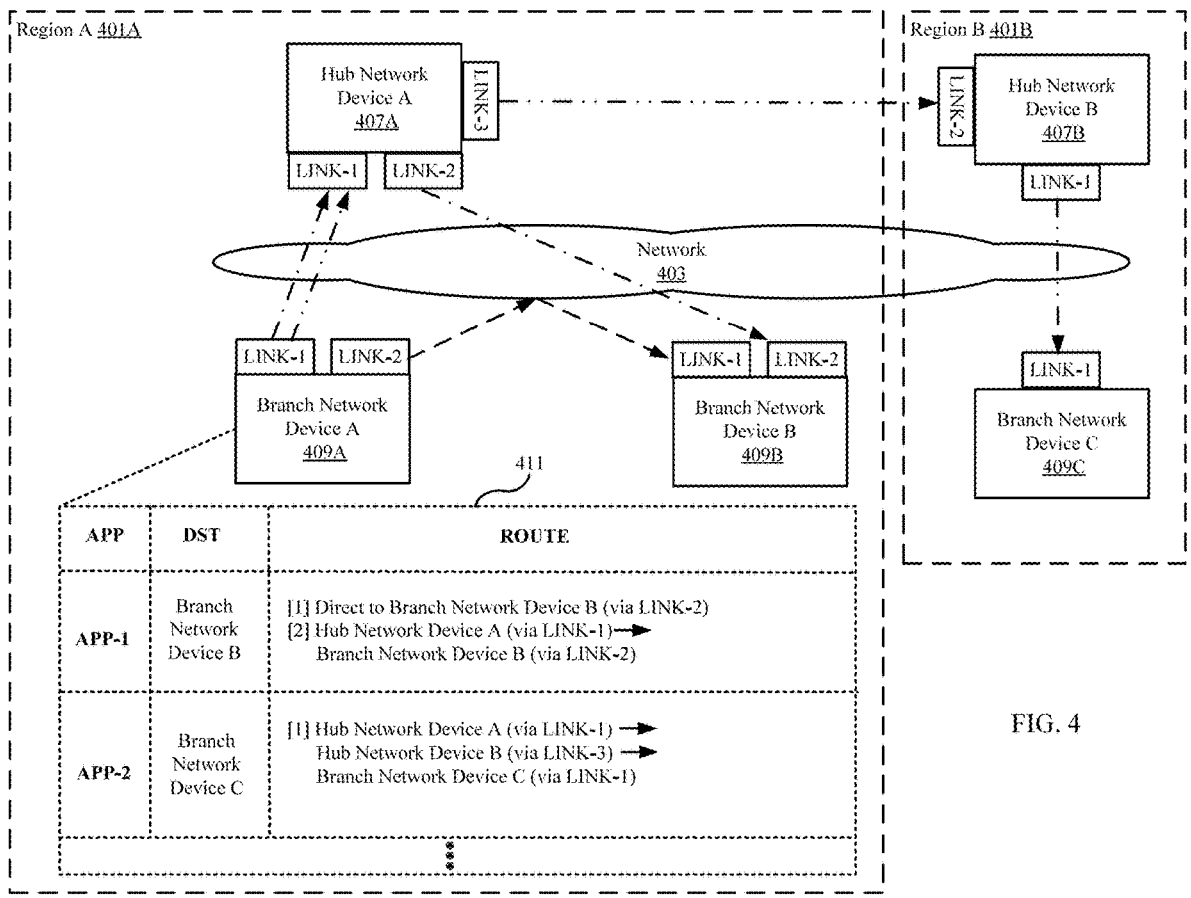
FIG. 4 shows an example in accordance with one or more embodiments described herein.

To further clarify embodiments of the disclosure, another example is provided in FIG. 4.

Start of Example

Initially, as shown in FIG. 4, assume that a WAN (e.g., 100, FIG. 1A) includes two regions (e.g., 103A-103B, FIG. 1A), region A (401A) and region B (401B), that are connected by a network (403) (e.g., 117, FIG. 1B). Region A (401A) includes a hub network device A (407A) (e.g., 113A-113N, FIG. 1B), a branch network device A (409A) (e.g., 111A-111N, FIG. 1B), and a branch network device B (409B). Region B (401B) includes a hub network device B (407B) and a branch network device C (409C). Each network device shown in FIG. 4 includes links (e.g., LINK-1, LINK-2, etc.) representing a connection at an ingress/egress port of the device.

As shown in FIG. 4, branch network device A (at any given point in time) receives an application-aware virtual topology (AAVT) routing table (411) from a network controller (not shown) (e.g., 115, FIG. 1B, 301 of FIG. 3A). The AAVT routing table (411) includes entries representing (from left to right of the table): (i) an application classification column, (ii) a destination column, and (iii) a route column.

The application classification column (APP) specifies a classification of an application (referred to below as "application classification") associated with network traffic to be transmitted by branch network device A (409A). For example, APP-1 in the AAVT routing table (411) may represent a voice application while APP-2 may represent a video application. The destination column (DST) specifies a transmission destination for each network traffic. The route column specifies routes (e.g., routes represented by single virtual-hop paths and multiple virtual-hop paths) with path characteristics that are best suited for transmitting network traffic associated with each application classification. The route column specifies these routes as a stack of paths (discussed above in reference to FIG. 2B) while also specifying the specific link (e.g., LINK-1, LINK-2, etc.) of each network device used for transmitting network traffic associated with each application classification.

As one example shown in FIG. 4, the first entry of the AAVT routing table (411) specifies that network traffic associated with application classification APP-1 has two possible routes (e.g., [1] and [2]) for reaching branch network device B (409B). The first route [1] (represented by the broken line with only dashes) is a direct transmission (e.g., a single virtual-hop path) to branch network device B (409B) originating from LINK-2 of branch network device A (409A). The second route [2] (represented using the dot-dash-dot broken line) is a multiple virtual-hop path first from LINK-1 of branch network device A (409A) to hub network device A (407A) and then from LINK-2 of hub network device A (407A) to the destination branch network device B (409B).

As another example shown in FIG. 4, the second entry of the AAVT routing table (411) specifies that network traffic associated with application classification APP-2 has only a single option (e.g., route [1] of the second entry) for reaching branch network device C (409C) in region B (401B). This route [1] of the second entry for network traffic associated with APP-2 (represented using the dot-dot-dash broken line) is a multiple virtual-hop path that: originates from LINK-1 of branch network device A (409A) to hub network device A (407A), gets forwarded via LINK-3 of hub network device A (407A) to hub network device B (407B), and finally transmitted via LINK-1 of hub network device B (407B) to destination branch network device C (409C).

End of Example

Figure 5:
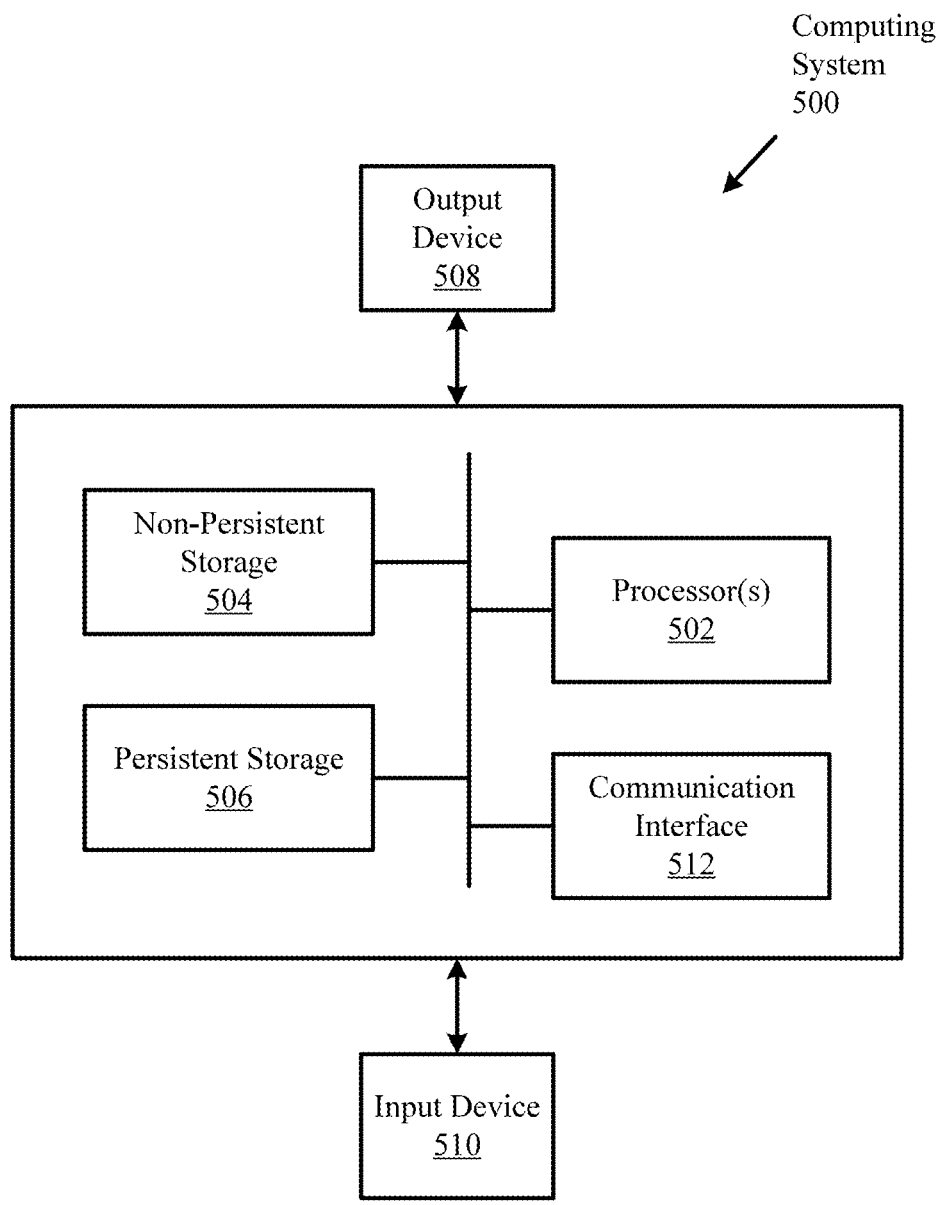
FIG. 5 shows a diagram of a computing device in accordance with one or more embodiments described herein.

As discussed above, embodiments disclosed herein may be implemented using computing devices. FIG. 5 shows a diagram of a computing device in accordance with one or more embodiments disclosed herein. Computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), communication interface (512) (e.g., Bluetooth interface, infrared interface, network interface, optical interface, etc.), input devices (510), output devices (508), and numerous other elements (not shown) and functionalities. Each of these components is described below.

In one embodiment disclosed herein, computer processor(s) (502) may be an integrated circuit for processing instructions. For example, the computer processor(s) may be one or more cores or micro-cores of a processor. Computing device (500) may also include one or more input devices (510), such as a touchscreen, keyboard, mouse, microphone, touchpad, electronic pen, or any other type of input device. Further, communication interface (512) may include an integrated circuit for connecting computing device (500) to a network (not shown) (e.g., a local area network (LAN), a wide area network (WAN) such as the Internet, mobile network, or any other type of network) and/or to another device, such as another computing device.

In one embodiment disclosed herein, computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (502), non-persistent storage (504), and persistent storage (506). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term connected, or connection, means that there exists between elements/components/devices a direct or indirect connection that allows the elements to interact with one another in some way. For example, the term 'connected' may refer to any direct (e.g., wired and/or wireless directly between two devices or components) or indirect (e.g., wired and/or wireless connections between any number of devices or components connecting the connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method of generating routing information for a given network device in a plurality of network devices in a wide area network, the method comprising:
    obtaining reachability information specifying paths between the plurality of network devices in the wide area network;
    obtaining path metric information indicative of at least one path property for each of the paths;
    obtaining application information indicative of one or more applications for which network traffic transmission is being handled by the given network device; and
    generating an application-aware virtual topology (AAVT) routing table for the given network device based on the reachability information, the path metric information, and the application information, wherein the AAVT routing table identifies a set of routes between the given network device and an additional network device in the plurality of network devices based on the reachability information, wherein the AAVT routing table identifies a set of path properties for the set of routes based on the path metric information, and wherein the AAVT routing table associates a given application of the one or more applications with a given route in the set of routes based on the set of path properties.

2. The method defined in claim 1, wherein the AAVT routing table includes one or more entries each associated with a corresponding one of the one or more applications and wherein each of the one or more entries identifies at least one route for the corresponding application.

3. The method defined in claim 1 further comprising:
    generating an underlay graph based on the paths between the plurality of network devices, the underlay graph specifying a topology of the wide area network.

4. The method defined in claim 3, wherein the underlay graph identifies multiple-hop paths that each include multiple single-hop paths.

5. The method defined in claim 1, wherein the at least one path property comprises a path latency, a path jitter, a path loss, a path total bandwidth, or a path total utilization.

6. The method defined in claim 1 further comprising:
determining a given path property that reflects a path quality for conveying network traffic associated with the given application, wherein the given route is associated with the given application based on the given path property for the set of routes.

7. The method defined in claim 6, wherein the given application is a voice application, wherein the path property comprises a path jitter, and wherein the given route has a lower path jitter when compared to one or more other routes in the set of routes.

8. The method defined in claim 6, wherein the AAVT routing table includes an entry for the given application that identifies the given route for transmitting the network traffic associated with the given application and an additional entry for an additional application that identifies an additional route for transmitting network traffic associated with the additional application.

9. The method defined in claim 1 further comprising:
obtaining network policy information, wherein the AAVT routing table for the given network device is generated based on the network policy information.

10. The method defined in claim 9, wherein the network policy information comprises a security policy.

11. The method defined in claim 1, wherein the AAVT routing table is generated by a network controller, the method further comprising:
transmitting, by the network controller, the generated AAVT routing table to the given network device.

12. A method for obtaining application-aware virtual topology (AAVT) routing information for a wide area network, the method comprising:
obtaining, by a network controller, path information for a plurality of network devices in the wide area network;
identifying, by the network controller, a topology of the wide area network based on the obtained path information;
obtaining, by the network controller, application information for a set of applications for which traffic is handled by a set of network devices in the plurality of network devices; and
generating, by the network controller, one or more AAVT routing tables each for a corresponding network device in the set of network devices, each entry in the one or more AAVT routing tables associates an application in the set of applications with a corresponding route, wherein the corresponding route in each entry in the one or more AAVT routing tables optimizes for one or more path metrics specific to the application for that entry.

13. The method defined in claim 12, wherein the path information comprises reachability information specifying paths between the plurality of network devices.

14. The method defined in claim 13, wherein the path information includes a path metric for each of the paths.

15. The method defined in claim 12 further comprising:
transmitting, by the network controller, each of the one or more AAVT routing tables to the corresponding network device.

16. The method defined in claim 12, wherein the one or more path metrics, for which the corresponding route in each entry in the one or more AAVT routing tables is optimized, comprise a path latency, a path jitter, a path loss, a path total bandwidth, or a path total utilization.

17. A method for operating a network device in a wide area network, the method comprising:
obtaining, by the network device, an application-aware virtual topology (AAVT) routing table that includes a set of entries each identifying an application classification and one or more routes associated with the application classification, wherein the one or more routes identified by a given entry in the set of entries are for a transmission destination and are preferentially identified by the given entry, based on a path metric used for each application of a same application classification, over at least one other route to the transmission destination;
making a determination, by the network device, that network traffic to be transmitted is associated with a given application classification identified in the given entry in the set of entries of the AAVT routing table; and
transmitting the network traffic associated with the given application classification based on the one or more routes identified in the given entry.

18. The method defined in claim 17, wherein the set of entries each identify a corresponding transmission destination and wherein the network traffic has the corresponding transmission destination of the given entry in the set of entries.

19. The method defined in claim 17, wherein the one or more routes identified in the given entry comprise a single hop path and a multiple-hop path and wherein the network traffic is transmitted based on the single-hop path or the multiple-hop path.

20. The method defined in claim 17, wherein the AAVT routing table is obtained by receiving the AAVT routing table from a network controller that transmits an additional AAVT routing table to an additional network device in the wide area network.

* * * * *